July 18, 1950
H. E. CREECH
2,515,696
COMBINATION REGULAR AND TEST CONNECTOR
FOR AUTOMATIC TELEPHONE SYSTEMS
Filed June 26, 1947
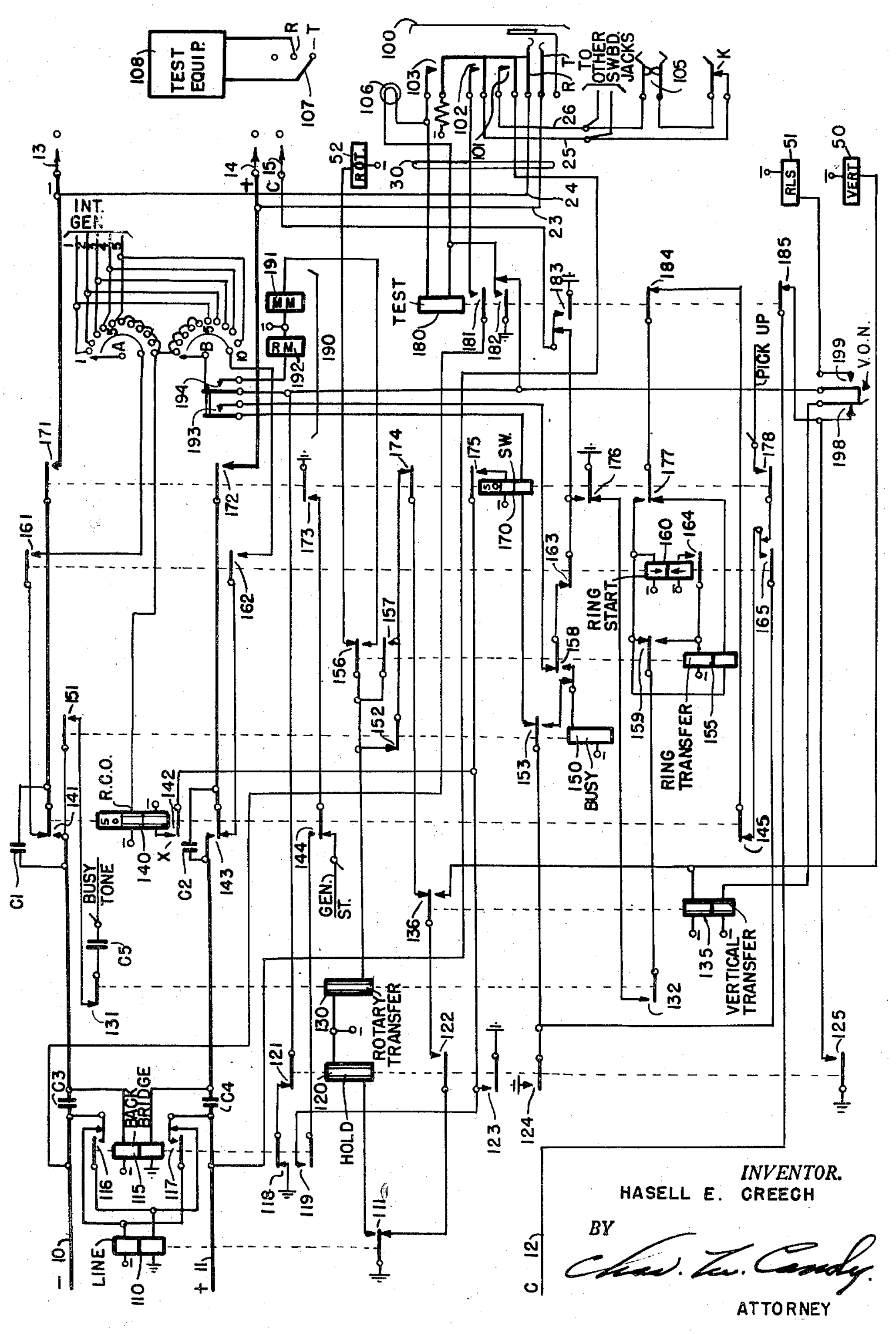
INVENTOR.
HASELL E. CREECH
BY Chas. W. Candy
ATTORNEY Patented July 18, 1950 2,515,696

UNITED STATES PATENT OFFICE 2,515,696

COMBINATION REGULAR AND TEST CONNECTOR FOR AUTOMATIC TELEPHONE SYSTEMS

Hasell E. Creech, Orangeburg, S. C., assignor to Automatic Electric Laboratories, Inc., Chicago, Ill., a corporation of Delaware Application June 26, 1947, Serial No. 757,185

4 Claims. (Cl. 179—175.2)

This invention relates to testing arrangements in general, particularly to testing arrangements for use in small automatic telephone systems and is concerned primarily with improved apparatus for extending a connection from testing equipment to a subscriber's line terminating in an automatic telephone exchange.

In large automatic telephone systems it is usual practice to install a test connector switch for each group of connectors, the test connector being accessible only to authorized persons in the telephone exchange. However, in small exchanges, say 400 lines or less, the cost of installing separate test connectors is not warranted, therefore a feature of this invention is a simple and inexpensive means of converting one regular connector in each connector group so that it will not only be accessible to all subscribers for regular telephone calls, but also be accessible to authorized personnel of the telephone exchange for use in testing the subscriber lines in that connector group.

Essentially the functions of a test connector is to allow direct access to the line in question without any appendages on the line within the exchange, irrespective as to the line being in an idle or busy condition, so that various test instruments may be connected thereto for the purpose of measuring the line constants, causing ringing tests of the subscribers' signalling device, dial speed and percent make contact tests of the calling device and checks for open or shorted loop and ground faults.

A feature of this invention is the inexpensive and simple means whereby, upon the addition of a relay and a switchboard jack to one of the existing connector switches within a connector group, the connector is converted for use both as a regular connector as well as a test connector.

The invention is shown diagrammatically on the associated drawing and for purposes of this specification a connector switch of the well known Strowger type is illustrated. This connector switch, which has been converted for use as a regular connector as well as a test connector, is arranged for use on ten party lines using harmonic ringing, whereby one-half of the subscriber station signalling devices are connected between one side of the line to ground and the other half connected between the other side of the line and ground, therefore full selective ringing for the stations is accomplished in the well known manner.

Upon reading the following specification it will readily be seen that this conversion of a regular connector into a combination connector is not necessarily limited to the one type of connector as shown, but may be used with other types well known in the art.

Referring now to the drawing, as previously mentioned a standard connector switch for ten party selective harmonic signalling is shown, and a standard ten point switch 190, having two banks of contacts, commonly known in the art as a Minor Switch, is the means whereby the selective signalling is controlled.

The test relay 180 and the switchboard jack 100 together with the associated wiring are the additions to the standard connector switch which form the body of this invention.

When a subscriber wishes to call another subscriber, the calling subscriber's talking circuit will be extended, upon the removal of his handset, to a free selector switch, not shown, and upon dialing the hundreds line digit of the call number the calling line will be connected to the conductors 10 and 11 in a manner well known in the art. The dialing of the tens line digit of the call number will cause the connector switch to advance its wipers vertically to the desired level and dialing of the units line digit will advance the wipers horizontally to the terminals of the called line. A last and final digit of the call number corresponding to the station signalling number is dialed and thereby steps the Minor Switch 190 to the desired position corresponding to the generator frequency and the side of the line over which the signalling current is to be sent out.

It has been assumed, for purposes of simplifying this specification, that the test relay 180 is mounted on the connector switch base, whereas the switchboard jack 100, the busy lamp 106, the calling device 105 and the release key K are connected to the connector switch by means of outside connections, say cable 30, and are mounted at a convenient place in the exchange. There is a switchboard jack and a busy lamp associated with each connector switch converted for test purposes and the calling device 105 and release key K are common to all of said jacks. It follows that if the automatic exchange in question is equipped for, say 400 subscriber lines, there would be four combination regular and test connector switches, one for each group of one hundred subscriber lines, and four switch board jack and lamp combinations. Access to a combination connector for test purposes is via the telephone type plug 107 which is inserted into the switchboard jack 100. The tip and ring of the plug being connected to leads to which the necessary testing equipment, represented by the rectangle 108, terminates as needed.

The operation of the connector switch, shown in Figure 1, as a regular connector, will now be described, tracing a call from one subscriber to another subscriber within the automatic telephone exchange. When the connector switch is seized by a calling subscriber through the medium of preceding switches, the line relay 110 operates over the closed loop by way of the talking conductors 10 and 11 and contacts 116 and 117. Relay 110, upon operating, at make contacts 111 energizes the hold relay 120. Relay 120, upon operating, at contacts 125 places holding ground on the control conductor 12 by way of contacts 198 and 185 to maintain the preceding switches and also energizes the lower winding of the vertical transfer relay 135, at contacts 121 opens a point in the release circuit, at contacts 122 prepares a portion of the impulsing circuit, at contacts 123 prepares a locking circuit for relays 140 and 170 and at contacts 124 prepares the operating circuits for relays 170 and 160. Relay 135, upon operating, at make contacts 136 further prepares the impulsing circuit to the vertical magnet 50 and in multiple, a circuit to its own upper winding. When the tens digit of the line number is dialed by the calling subscriber, line relay 110 releases and reoperates in the well known manner in accordance with the number of impulses of the dialed digit, causing the operation of the vertical magnet 50 to step the wipers 13, 14 and 15 of the switch opposite the corresponding level of bank contacts. Upon the first operation of the vertical magnet 50 the vertical off-normal springs V. O. N. operate and at contacts 199 closes a point in the switch release circuit and at contacts 198 open the energizing circuit to the lower winding of relay 135. Relay 135, however, is of the slow-to-release type and will remain operated throughout the series of dialed impulses by means of its upper winding which is energized each time the line relay 110 restores in response to the dialed number. At the end of this series of impulses, the vertical transfer relay 135 restores, opening at contacts 136 the circuit to its upper winding and the vertical magnet 50 and prepares a multiple circuit to the rotary magnet 52 and the rotary transfer relay 130.

Responsive to the next digit dialed by the calling subscriber, the rotary magnet 52 is operated under the control of the line relay 110 in the usual manner and rotates the switch wipers 13, 14 and 15 into engagement with the bank contacts terminating the line conductors of the called number. Relay 130 operates in multiple with the rotary magnet 52, remaining operated during impulsing due to its slow-to-release characteristics and at contacts 131 opens a point in the busy tone circuit and at contacts 132 closes an operating circuit to relay 160. Relay 160 operates by way of ground at contacts 176, make contacts 132 to negative battery through its upper winding. Relay 160 at contacts 161 and 162 closes a point in the ringing circuit, at contacts 163 opens a point in the operating circuit of the switching relay 170, at contacts 164 prepares a circuit to its lower winding and at contacts 165 connects ground from contacts 124, through contacts 145, 184, 177 to the lower winding of relay 155. Relay 155, however will not operate, it being shunted by ground from contacts 176 by way of contacts 132 and 159.

At the end of the series of impulses relay 130 restores and at contacts 132 opens the operating circuit to relay 160, also removing the shunt from relay 155. Relay 155 now operates by way of ground at contacts 124, contacts 165, 145, 184 and 177, lower winding relay 155, upper winding relay 160 to negative battery. Relay 160 therefore remains operated. Relay 155, upon operating, at contacts 156 transfers the impulsing circuit from the rotary magnet 52 to the motor magnet 191 of the Minor Switch 190, at contacts 157 closes a multiple path of the impulsing circuit, at contacts 158 closes a point in the circuit for the busy relay 150, and at contacts 159 prepares a circuit to its upper winding and to the lower winding of relay 160.

The last or ringing digit of the call number is now dialed and the motor magnet 191 is operated under the control of the line relay 110 in the usual manner and rotates the wipers of the minor switch banks A and B to the terminals corresponding to the dialed digit, the off-normal springs 193 and 194 closing on the first step of the switch and remaining closed until the wipers are restored to their normal position. Relay 130 reoperates in multiple with the motor magnet 191 and remains operated for the duration of the series of impulses of the last digit and at contacts 132 connects ground from contacts 176 to the upper winding of relay 155 and to the lower winding of relay 160. Relay 160 is a differential type relay, its windings being in opposition to each other, therefore upon the energization of its lower winding the relay restores, opening at contacts 161 and 162 the ringing circuit, at contacts 163 closing the busy test circuit, at contacts 164 opening the circuit to its lower winding and at contacts 165 opening the holding circuit to its upper winding. Relay 155 is held operated during the series of impulses of the last digit by its upper winding, therefore a circuit is closed to the busy relay 150.

If the called line is busy, relay 150 operates by way of ground on the control wiper 15, contacts 183, 163 and 158 to negative battery. Upon operating, relay 150 at contacts 151 closes a point in the busy tone circuit, at contacts 152 opens a point in the impulsing circuit, which however, is being maintained by relay 155 at contacts 157, and at contacts 153 prepares its own locking circuit.

At the end of the series of impulses of the last dialed digit, the rotary transfer relay 130 restores, placing at contacts 131, busy-tone through the condenser C5 and contacts 151, to the negative talking conductor, which in the usual manner will indicate to the calling subscriber that the called line is in use. Relay 130, upon restoring, also at contacts 132 opens the holding circuit to the upper winding of relay 155. Relay 155, upon restoring, at contacts 157 opens the impulsing circuit so that no further impulses, if accidentally transmitted, will affect the switch and at contacts 158 closes the locking circuit to the busy relay 150.

If however, the called line is idle, negative battery from the cut-off relay, not shown, of the called line's line circuit will be encountered by the wiper 15 therefore, the busy relay 150 will not operate. Relay 155 now being in its deenergized position, as mentioned above has closed at contacts 158 an operating circuit for the switching relay 170. Relay 170 operates by way of ground at contacts 124, contacts 153, lower winding of relay 170, off normal springs 193, contacts 158, 163 and 183, wiper 15 to negative battery through the called line cutoff relay. Relay 170 now closes at contacts 175 a holding circuit to its upper winding, at contacts 173 closes the circuit to the generator start lead, at contacts 171 and 172 prepares the ringing circuit, at contacts 174 opens the impulsing circuit, at contacts 176 places ground on the control wiper 15 to maintain the called line line equipment, and the called line busy, at contacts 177 prepares an operating circuit to the upper winding of relay 160 and at contacts 178 connects the pick-up lead to the upper winding of relay 160.

Ground is momentarily placed on the pick-up lead at the start of a ringing cycle, which operation is well known in the art, and therefore relay 160, upon operating by way of its upper winding, at contacts 165 transfers its operating circuit from the pick-up lead to ground at contacts 124, at contacts 163 opens the initial energizing circuit of relay 170, and at contacts 161 and 162 closes the ringing circuit to the called line.

The called line is now signalled in the well known manner from ground connected interrupted generator lead 3, assuming that the last digit dialed was 3, through the third contact of the bank A of the Minor Switch, its wiper, contacts 161, 141 and 171, wiper 13, out over the negative side of the called line, through the called station signalling device and condenser to ground. Ring back tone is impressed on the calling line through condensers C1, C2, C3 and C4 in the well known manner. If however, the last digit dialed was 8, the Minor Switch wipers would therefore be on the eighth terminals and the generator lead 3 would now be connected to the positive side of the called line by way of wiper 14.

When the called party answers a direct current loop is closed in the well known manner and the ring cut-off relay 140 operates, by way of ground on the generator lead 3, over the negative line, through the called subscriber's station, back over the positive line to the upper winding of the ring cut-off relay 140 to negative battery. Relay 140, upon operating, at contacts 142 closes a holding circuit to its lower winding, at contacts 141 and 143 disconnects the ringing circuit from the talking conductors and completes the talking path between the calling and called subscribers, at contacts 144 opens the generator start circuit and prepares another holding circuit for its lower winding and relay 170, and at contacts 145 opens the holding circuit to relay 160. Relay 160 restores and further opens the ringing circuit.

Upon the closure of the talking path by relay 140 the back-bridge relay 115 operates over the called subscribers loop and at contacts 116 and 117 reverses the calling line connections in the well known manner to give supervision, at contacts 118 opens another point in the release circuit and at contacts 119 closes another point in the holding circuit for relays 140 and 170.

Talking battery is now supplied to the calling subscriber by the line relay 110 and to the called subscriber by the back-bridge relay 115 and conversation may now commence.

When the calling and called subscribers have completed their conversation they will replace their handsets which opens their respective talking loops and the connector switch is restored to normal. In case the calling subscriber restores his handset before the called subscriber, relay 110 will restore to normal, which in turn restores relay 120. Relay 120 upon restoring, at contacts 125 removes ground from the control lead 12 which allows the previous switches operated by the calling subscriber to restore to normal. Nothing else happens at this time as the back-bridge relay 115 is held operated by the called subscriber's closed loop and relays 140 and 170 are held operated by the ground connected through contacts 119.

However, when the called subscriber replaces his handset, relay 115 restores and at contacts 119 opens the holding circuit for relays 140 and 170, which in turn restore and at contacts 118 completes the release circuit.

This release circuit may be traced from ground at contacts 118, through contacts 121, Minor Switch off-normal springs 194 to the release magnet 192 of the Minor Switch. The release magnet 192, upon operating, allows the wipers of the Minor Switch to restore to their normal position at which point the off-normal springs 193 and 194 are opened, thereby opening the circuit to the release magnet 192. The release ground at contacts 118 also can be traced through contacts 121, through the vertical off-normal springs 199 to the release magnet 51 of the connector switch. The release magnet 51, upon operating, allows the switch wipers 13, 14, and 15 to restore to normal, the vertical off-normal springs 198 and 199 closing and opening respectively when the switch shaft reaches its normal restored position.

*Use as a test connector*

If the connector switch is to be used for testing a subscriber's line, the exchange attendant inserts the plug 107, to which is connected the necessary test equipment, 108, into the switchboard jack 100 which actuates the auxiliary contact springs 101, 102 and 103. Upon the insertion of the plug 107 into the jack 100 the test relay 180 operates by way of ground at contacts 118, contacts 121 and 182, winding relay 180 to negative battery at contacts 103. Relay 180, upon operating, at make-before-break contacts 183 places ground on the control wiper 15 and opens the operating circuit for the switching relay 170 and the test circuit for the busy relay 150, at contacts 181 connects the negative talking conductor 10 through contacts 102 and the key K to one of the impulse springs of the calling device 105, at make-before-break contacts 182 closes a locking circuit for itself, at contacts 184 opens the holding circuit for relay 160 and at contacts 185 removes negative battery through the lower winding of relay 135 from the control conductor 12, thereby making the connector switch busy to any preceding switch. The lamp 106, connected in multiple with the winding of the test relay 180, lights, indicating that the connector is being used for test purposes. The positive line conductor 11 is connected by way of contacts 101 to the other impulse spring of the calling device 105, therefore completing a circuit for the operation of the line relay 110. Relay 110 operates and as explained previously prepares the switch to receive dialed impulses. The exchange attendant now dials the number of the line to be tested on the calling device 105, the line relay 110 following the impulses produced by the dial impulse springs 105. After the dialing of the two numbers of the called line the connector switch has stepped the wipers 13, 14, and 15 into engagement with the bank contacts terminating the called line in the same manner as previously described.

The talking conductors terminating in connector wipers 13, and 14 are now connected, free of any appendages to the test equipment by way of the tip "T" and ring "R" springs of the jack 100 and the plug 107, so that testing of the line may be done. If a station on the line being tested is to be signalled the correct ringing frequency is connected to the tip and ring leads in the test equipment 108 and will be extended out over the line by way of conductors 23 and 24.

When testing of the line has been completed and the exchange attendant wishes to test another line immediately next to it on the same horizontal bank level, he may dial the digit one which will momentarily deenergize the line relay 110 which in turn closes the operating circuit for the rotary transfer relay 130 and the rotary magnet 52 in multiple, thereby rotating the switch wipers one step. It will be noted that this digit is the same as a third digit for ring selection when the connector switch is used by a subscriber, but that the test relay 180 has, at contacts 184, opened up the circuit for the ring transfer relay 155 so that it will not operate and connect the Minor Switch 190 into the impulsing circuit. Relay 160 will operate each time relay 130 operates but has no effect on the operation of the switch and will not lockup as previously described. The switch wipers may also be rotated one step by momentarily opening the key K, which is in effect the same as dialing one, however the key should not be held open long enough to cause the release of the hold relay 120.

When the exchange attendant wishes to test a line on a different horizontal level than that on which he has been testing, he will operate the key K, which will open the circut for the line relay 110 causing it to restore and in turn restore the hold relay 120. Upon the restoration of these two relays the switch release circuit will be closed and the connector switch wipers will return to normal at which time the key K may again be closed, and upon the reoperation of the line relay 110 and the hold relay 120, the connector switch will again be in condition to receive further dialed impulses for selecting another line to be tested. The connector switch, however, will remain busy to preceding switches as the test relay 180 is still operated and at contacts 185 has removed battery potential from the control lead 12.

Upon the removal of the plug 107 from the jack 100, the circuits to the line relay 110 and the test relay 180 will be opened, the indicating lamp 106 extinguishes, and therefore the connector switch will restore to normal condition and be free to receive a call placed by a subscriber.

This completes the description of the operation of the invention and what is considered new and is desired to have protected by Letters Patent is sufficiently stated in the appended claims.

What is claimed is:

1. In a telephone system, an automatic switch, two circuits having access to said switch for seizing said switch, a first relay in said switch, means for operating said relay in case said switch is seized from either of said circuits, means for operating said switch to extend a connection, a circuit controlled by said operated first relay for maintaining said switch operated, another relay in said switch, means including a circuit completed for operating said other relay in case said switch is seized from one of said circuits, and contacts on said first relay circuit for disabling said other relay in case said switch is seized from the other of said circuits.

2. In a telephone system, an automatic switch, two paths over which said switch may be seized and over which trains of impulses may be received for operating said switch, a magnet for operating said switch, means for operating said magnet responsive to one train of impulses received by said switch in case it is seized over either of said paths, an auxiliary switch, means for operating said auxiliary switch responsive to a subsequent train of impulses received by the first of said switches in case it is seized over one of said paths, means for disabling said auxiliary switch operating means in case said first switch is seized over the other of said paths, and said first means effective after operation of said disabling means for reoperating said magnet responsive to a subsequent train of impulses received by the first of said switches in case it is seized over the other of said paths.

3. In a telephone system, an automatic switch having incoming and outgoing conductors, a test position, a path for seizing said switch, means for connecting said test position to said incoming conductors to seize said switch over said path, another path for seizing said switch, means for preventing the connection of said test position to said incoming conductors in case said switch is seized over said other path, and means for connecting said test position to said outgoing conductors regardless of whether or not said switch is seized.

4. In a telephone system, an automatic switch, a first path for seizing said switch, a second path for seizing said switch, control apparatus operated responsive to seizure of said switch over either said first path or said second path, a relay operated in case said switch is seized over said second path, circuits completed by the operation of said relay for operating said control apparatus, means in said control apparatus for disabling said relay in case said switch is seized over said first path, and contacts on said relay for disabling said first path to prevent seizure of said switch in case said switch is seized over said second path.

HASELL E. CREECH.

REFERENCES CITED

The following references are of record in the file of this patent:

UNITED STATES PATENTS

| Number | Name | Date |
|---|---|---|
| 1,543,900 | Bertels | June 30, 1925 |
| 1,813,138 | Beale | July 7, 1931 |
| 1,864,553 | Quass | June 28, 1932 |
| 2,327,458 | Relfe | Aug. 24, 1943 |